Figure 1:
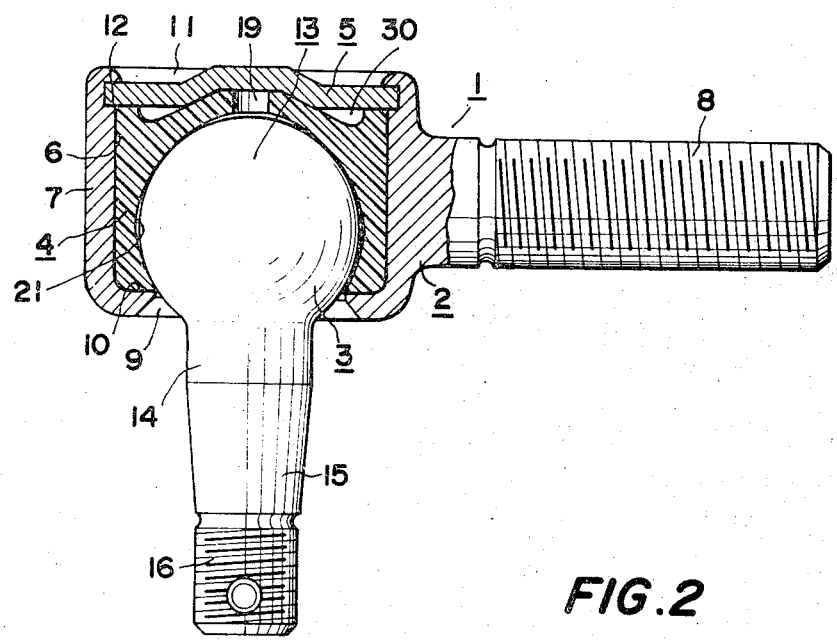

United States Patent [19]

Uchida

[11] 3,856,423
[45] Dec. 24, 1974

[54] BALL JOINT
[75] Inventor: Yasuo Uchida, Hamamatsu, Japan
[73] Assignee: Ishikawa Tekko Kabushiki Kaisha, Tokyo, Japan
[22] Filed: Apr. 10, 1973
[21] Appl. No.: 349,692

[30] Foreign Application Priority Data
  Feb. 6, 1973  Japan.................. 48-15275

[52] U.S. Cl. ............................ 403/140, 308/DIG. 8
[51] Int. Cl. ....... B25g 3/38, F16f 7/00, F16c 11/06
[58] Field of Search ........................ 403/122–140; 308/DIG. 8

[56] References Cited
UNITED STATES PATENTS

| | | | |
|---|---|---|---|
| 2,917,334 | 12/1959 | Baker.................................. | 403/140 |
| 3,201,183 | 8/1965 | Buske........................... | 308/DIG. 8 |
| 3,233,929 | 2/1966 | Herbenar........................... | 403/140 |
| 3,249,375 | 5/1966 | Herbenar........................ | 403/140 X |
| 3,560,035 | 2/1971 | Kindel................................ | 403/140 |

*Primary Examiner*—Geo. V. Larkin
*Attorney, Agent, or Firm*—Stevens, Davis, Miller & Mosher

[57] ABSTRACT

This invention relates to ball joint which comprises a bearing member made in one piece from a self-lubricating plastic material, and a ball stud provided with a spherical head slidably received in the bearing member. The bearing member has a bearing surface comprising a pair of upper and lower surfaces of approximately spherical shape juxtaposed to each other with the equator line of the spherical head of the ball stud being interposed therebetween, the spherical head of the ball stud is supported by a pair of upper and lower bearing zones, and an annular pocket is formed on the equator line for storing a quantity of lubricant therein.

4 Claims, 2 Drawing Figures

Patented Dec. 24, 1974  3,856,423

BALL JOINT

This invention relates to ball joints, and more particularly it is concerned with a ball joint of the type which is used with a mechanism for steering or suspending a motor vehicle.

Specifically, the invention provides an improvement in or relating to a ball joint of the permanent lubrication type in which a bearing member made in one piece from a plastic material is used and the spring member is eliminated.

An object of the invention is to provide a ball joint which has an improved bearing structure and which is capable of producing a stable operational torque and performing smoothly and lightly at the time it is assembled and throughout its service period.

Another object is to provide a ball joint comprising buffer means which permits the ball joint satisfactorily to absorb shock and vibration to which it is subjected.

Another object is to provide a ball joint wherein the bearing member made in one piece from a plastic material has suitable resilience and rigidity and is self-lubricating, the bearing surface comprises a pair of upper and lower surfaces of approximately spherical shape disposed in juxtaposed relationship with the equator line of a spherical head portion of a ball stud being interposed therebetween and the spherical head of the ball stud is supported by a pair of upper and lower annular bearing zones at the surfaces of approximately spherical shape so that an annular lubricant pocket is formed in a portion of the inner surface of the bearing member which corresponds to the equator line of the spherical head.

Still another object is to provide a ball joint wherein the bearing member has a diverging outer surface in the upper portion of its cylindrical body and an annular recess at the top of its body, so that the spherical head of the ball stud is preloaded and an annular space performing an air cushioning action is formed between the top of the bearing member and the cap for closing the socket when the bearing member is fitted in the cylindrical inner space of the socket.

Figure 2:
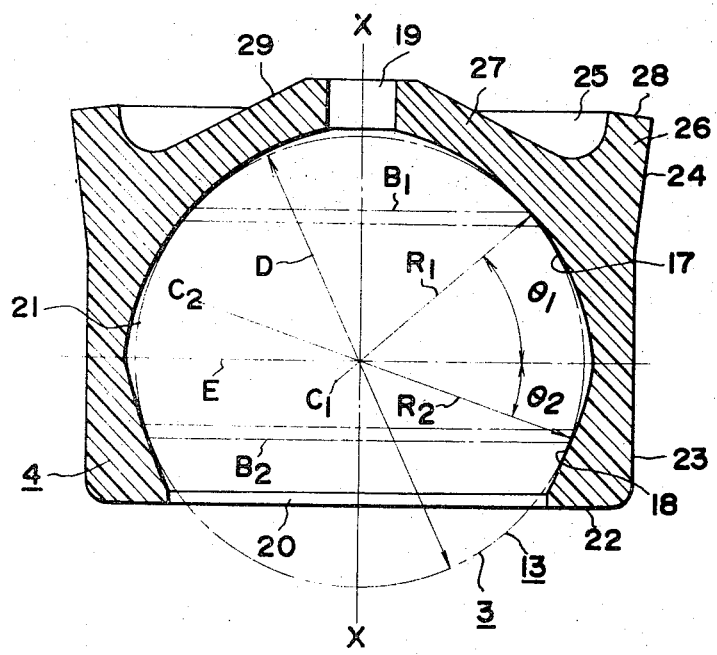

Additional and other objects as well as features and advantages of the invention will become evident from the description set forth hereinafter when considered in conjunction with the accompanying drawing, in which:

FIG. 1 is a side view of the ball joint comprising one embodiment of the invention, with certain parts being cut out; and FIG. 2 is vertical sectional view of the bearing member.

In FIG. 1, 1 is a ball joint used generally with a mechanism for steering a motor vehicle, which comprises a metallic socket 2, a metallic ball stud 3, a bearing member 4 made of a plastic material and a cap 5.

The socket 2 includes an annular head 7 forming a cylindrical inner surface 6, and a threaded shank 8 extending from the annular head to be connected to a tie rod (not shown). The cylindrical inner surface 6 is bent inwardly at its lower end to form a shoulder 10 and terminates in a lower opening 9. The annular head 7 is open at the top 11 which is adapted to be closed by the cap 5. When mounted on the annular head 7, the cap 5 can be firmly fixed to the socket 2 if it is brought into engagement with a shoulder 12 and the upper end of the annular head 7 is made to press against the cap 5.

The metallic ball stud 3 includes a spherical head 13 adapted to be supported by the bearing member 4 for sliding movement in all directions, and a cylindrical shank 14 extending from the spherical head 13. The shank 14 includes a conical portion 15 adapted to be wedged in a knuckle arm or a relay rod (not shown), and a threaded portion 16 which can be secured by a nut.

FIG. 2 shows the bearing member 4 removed from the socket. The bearing surface of the bearing member 4 for supporting the spherical head 13 of the ball stud 3 comprises a pair of bearing surfaces 17 and 18 of approximately spherical shape disposed in juxtaposed relationship above and below an equator line E of the spherical head 13 of the ball stud 3. The bearing surfaces 17 and 18 of approximately spherical shape can be obtained by rotating arcs in the range of 90° defined by the radii of curvature $R_1$ and $R_2$, respectively, about an axis X—X, the centers $C_1$ and $C_2$ of said radii of curvature $R_1$ and $R_2$ being eccentric. Annular bearing zones $B_1$ and $B_2$ are formed on circles in external contact with the sperical head 13 of a diameter D and the bearing surfaces 17 and 18 of approximately spherical shape having the radii of curvature $R_1$ and $R_2$ respectively. The annular bearing zones $B_1$ and $B_2$ increase their width due to the resilient deformation of the bearing material when the ball joint is assembled.

Thus the radii of curvature $R_1$ and $R_2$ and the diameter D of the spherical head 13 are related to one another such that $R_1 > \frac{1}{2}D$ and $R_2 > \frac{1}{2}D$. The positions of the centers $C_1$ and $C_2$ of circles having the radii $R_1$ and $R_2$ respectively and the latitudes $\theta_1$ and $\theta_2$ are determined such that the annular bearing zones $B_1$ and $B_2$ are disposed substantially in the middle of the bearing surfaces 17 and 18 of the bullet head shape respectively. The bearing surfaces 17 and 18 are defined to be of approximately spherical shape having the upper portion being removed by an upper minor opening 19 and a lower major opening 20, respectively, formed in the bearing member 4. The bearing surfaces 17 and 18 are contiguous with each other at a position which corresponds to the equator line E on the spherical head 13 and which is spaced apart from the periphery of the spherical head 13 to form therein an annular lubricant containing pocket 21, because the diameter of the inner surface of the bearing member 4 is maximized at this position.

The bearing member 4 includes a cylindrical outer surface 23 extending upwardly from a lower end surface 22 and having a diameter substantially equal to the diameter of the cylindrical inner surface 6 of the socket 2. The cylindrical outer surface 23 has in its upper portion an outwardly diverging surface 24. An annular recess 25 is formed at the top of the bearing member 4, so that the top of the bearing member 4 is divided by the annular recess 25 into an outwardly diverging peripheral portion 26 and a dome-shaped portion 27 in the center.

The bearing member 4 constructed as aforementioned is formed in one piece from a high molecular material having suitable resilience and rigidity and is self-lubricating. The material may be selected from the group comprising tetrafluoroethylene copolymer, acetal polymer, polyamides, polyester, and polyurethane.

The ball joint according to the invention is assembled as follows.

Before receiving the spherical head 13 of the ball stud 3, the bearing member 4 is coated with a lubricant, particularly in a portion thereof which corresponds to the equator line E on the spherical head 13. Then the spherical head 13 of the ball stud 3 is inserted in the bearing member 4. The lower opening 20 in the bearing member 4 has a diameter which is smaller than the diameter of the spherical head 13 of the ball stud 3. However, the diameter of the lower opening 20 can be increased when the spherical head 13 is forced thereinto, so that the spherical head 13 can be inserted through the opening 20 into the interior of the bearing member 4.

The bearing member 4 having the spherical head 13 fitted therein is inserted through the upper opening 11 of the socket 2 into the interior of the socket 2, so that the shank 14 of the ball stud 3 extends through the lower opening 9 in the socket 2 and the outer surface 23 of the bearing member 4 is brought into engagement with the inner surface 6 of the annular head 7 of the socket 2. Then the cap 5 is forced against the upper end portion of the bearing member 4. As the result, the cap 5 is brought into engagement with an upper end surface 28 of the outwardly diverging peripheral portion 26 and an upper surface 29 of the dome-shaped portion 27 of the bearing member 4. Thereafter the cap 5 is pressed into fixed engagement with the upper end of the socket 2 so that the bearing member 4 is preloaded vertically by the shoulder 10 in the socket 2 and the cap 5.

After the ball joint is assembled, the bearing surfaces 17 and 18 of approximately spherical shape having their upper portions being removed support the spherical head 13 of the ball stud 3 by the annular bearing zones $B_1$ and $B_2$ respectively, and the annular pocket 21 is formed on the equator line E on the spherical head 13. The annular pocket 21 serves as a lubricant sump for supplying the lubricant to the annular bearing zones $B_1$ and $B_2$. The annular bearing zones $B_1$ and $B_2$ have their width increased by the resilient deformation of the bearing material when the bearing member 4 is preloaded. The spherical head 13 is maintained in annular contact with the bearing surfaces 17 and 18, and the lubricant is constantly supplied from the pocket 21. Thus the ball joint can operate smoothly and lightly.

The outer diameter of the outwardly diverging peripheral portion 26 of the bearing member 4 is greater than the diameter of the inner surface 6 of the socket 2. Therefore, when the bearing member 4 is forced into the interior of the socket 2, the outwardly diverging peripheral portion 26 undergoes resilient deformation and is moved radially inwardly. Thus the bearing member 4 is preloaded radially.

In this way, the bearing member 4 is preloaded both vertically and radially, so that it preloads the spherical head 13 of the ball stud 3 such that the spherical head 13 tends to move toward its center. This permits the spherical head of the ball joint to be maintained in the central position at all times and to be compensated for wear.

At the same time, the outwardly diverging peripheral portion 26 of the bearing member 4 is brought into pressing engagement with the upper portion of the inner surface 6 of the socket 2. This increases the frictional dragging of the bearing member 4 on the socket 2 and prevents rotation of the bearing member 4 relative to the socket 2, thereby contributing to stable operation of the ball joint and the increased service life thereof.

The presence of the annular recess 25 prevents the outwardly diverging peripheral portion 26 from producing excess radially oriented pressure. Thus the production and assembling of various parts can be readily performed.

When the cap 5 is fastened to the annular head 7 of the socket 2, an annular space 30 is defined between the cap 5 and the top of the bearing member 4 and performs a pneumatic buffer action in cooperation with the annular bearing zones $B_1$ and $B_2$. The combination of the resilience of the bearing material with the preloading of the bearing 4 is effective to absorb complex vibration and impact oriented both axially and at right angles to the axis to which the ball stud 3 is subjected.

The ball joint according to the invention can produce a stable operational torque and perform smoothly and lightly at the time it is assembled and throughout its long service life.

What is claimed is:

1. A ball joint comprising a socket having a cylindrical inner surface and openings provided at both ends thereof, a ball stud having a spherical head, a bearing member for the spherical head which is mounted in said socket and which includes upper and lower concave bearing surfaces which are respectively disposed above and below the equatorial plane of the spherical head and which are connected in a region of their mutual largest diameter, said spherical head being supported by a pair of upper and lower bearing regions and an annular volume for receiving a lubricant supply existing between the region of the equatorial plane of said spherical head and the bearing surfaces, and further comprising a cover associated with said bearing member and inserted into said socket, characterized in that: said upper and lower bearing regions are respectively disposed substantially in the middle of said bearing surfaces, an air gap exists between the spherical head and the apex of the upper bearing surface, the bearing member includes in its upper side an annular recess disposed to generally correspond to the upper bearing region and a domed area at the top of said bearing member radially within said recess, the lower exterior surface of said bearing member being substantially cylindrical, and the upper exterior surface of said bearing member being biased outwardly from the cylindrical shape of said lower surface so that the uppermost portion of the upper exterior surface has a tendency to have a greater radius than the radius of said lower surface, and said cover abutting the upper side of the bearing member thereby axially pre-loading the ball stud, and defining an annular cavity between said upper side of the bearing member and said cover.

2. A ball joint according to claim 1, wherein the bearing member is a plastic material and the radii of curvature $R_1$ and $R_2$ of the upper and lower concave bearing surfaces, respectively, and the diameter $D$ of the spherical head, are related to one another such that $R_1 > \frac{1}{2}D$ and $R_2 > \frac{1}{2}D$, said radii of curvature $R_1$ and $R_2$ being defined by circles in external contact with the spherical head when said bearing member is not deformed.

3. A ball joint according to claim 1, wherein the upper exterior surface having a tendency to outwardly diverge, is deformed to conform to the inner cylindrical surface of the socket when the bearing member is within the socket, said deformation aiding in axially pre-loading said ball stud.

4. A ball joint bearing member for a spherical head, which includes upper and lower concave bearing surfaces which are respectively disposed above and below an equatorial plane and which are connected in the region of their mutual largest diameter, a pair of upper and lower bearing regions on said surfaces, said upper and lower bearing regions being respectively disposed substantially in the middle of said bearing surfaces, the bearing member including in its upper side an annular recess disposed to generally correspond to the upper bearing region and a domed area at the top of said bearing member radially within said recess, the lower exterior surface of said bearing member being substantially cylindrical, and the upper exterior surface of said bearing member being biased outwardly from that cylindrical shape of said lower surface so that the uppermost portion of the upper exterior surface has a tendency to have a greater radius than the radius of the said lower surface, said bearing member being a plastic material, and the radii of curvature $R_1$ and $R_2$ of the upper and lower concave bearing surfaces, respectively, and the diameter $D$ of a spherical head, to be inserted therein are related to one another such that $R_1 > \frac{1}{2}D$ and $R_2 > \frac{1}{2}D$, said radii of curvature $R_1$ and $R_2$ being defined by circles in external contact with the spherical head when said bearing member is not deformed.

* * * * *